United States Patent [19]

Smith et al.

[11] Patent Number: 4,663,038
[45] Date of Patent: May 5, 1987

[54] SIDE CHANNEL CLARIFIER

[75] Inventors: George W. Smith, Mukwonago; John W. Wittmann, New Berlin, both of Wis.

[73] Assignee: Envirex Inc., Waukesha, Wis.

[21] Appl. No.: 818,159

[22] Filed: Jan. 13, 1986

[51] Int. Cl.$^4$ ............................................. B01D 21/02
[52] U.S. Cl. ............................. 210/195.4; 210/532.1; 210/926
[58] Field of Search ............ 210/532.1, 533–540, 210/195.3, 195.4, 620, 621, 622, 623, 624, 625, 626, 628, 629, 926, 194

[56] References Cited

U.S. PATENT DOCUMENTS 3,694,353 9/1972 Yang et al. ........................ 210/629
4,009,106 2/1977 Smith ............................... 210/195 S

OTHER PUBLICATIONS

U.S. Environmental Protection Agency, "An Emerging Technology-Intrachannel Clarification: A Project Assessment", Jun., 1983.
Commercial publication "Economical to Build, Operate and Maintain", by Burns and McDonnell, Kansas City, Mo.

Primary Examiner—Frank Sever
Attorney, Agent, or Firm—Lawrence J. Crain

[57] ABSTRACT

A side channel clarifier for use in wastewater treatment devices employing the circulation of water in a tank having a circuitous path for the purposes of aeration and biological digestion of wastes, wherein the clarifier is mounted in the wall of the channel so that the main flow of water in the tank is undisturbed, and that a portion of that flow is diverted into as quiescent clarification zone, where an inclined baffle collects settled sludge and returns that sludge to the main flow for further decomposition. Siphoning means are provided to ensure the return of a substantial portion of the sludge to the main flow before stagnation occurs and without disrupting the inflow of wastewater into said clarifier. Means are also provided to separate the clarified effluent for further treatment.

29 Claims, 6 Drawing Figures

SIDE CHANNEL CLARIFIER

BACKGROUND OF THE INVENTION

The present invention relates to an apparatus used in conjunction with a wastewater treatment process involving the aeration and biological decomposition of organic waste matter. More particularly, the present invention pertains to clarification devices used with aeration devices having a channelized, circuitous flow of wastewater.

Channelized aeration devices normally involve an oval ditch or tank containing a level of wastewater, a means to induce a flow in the tank and a source of aeration. Typical methods of inducing flow and/or aeration include mechanical devices such as paddles or impellers, as well as forced air jets. As the wastewater circulates in the tank, biological organisms digest unwanted organic substances. The aeration of the water is designed to promote the survival of the biota and enhance their activity. Typically the water circulates in the tank for a specified period of time, or until a desired reduction in organic wastes is achieved.

An alternate form of channelized aeration device involves a vertically oriented channelized reactor or vertical looped reactor (VLR) of the type disclosed in U.S. Pat. No. 3,703,462 to Smith. In that device, an elongate tank is provided with a horizontal baffle joined to the side walls of the tank and is almost coextensive with the end walls. The tank is designed so that a cyclical over and under flow of water is induced by a combination of mechanical and pressurized means.

It has been customary to transfer treated effluent from channelized aeration tanks to a separate clarifier tank for final solids separation. Clarifier tans often comprise a relatively quiescent containment area where solid materials may settle out and floating wastes are skimmed from the surface of the water. Both settled and floating materials are collected and disposed of, either by recirculating them to the aeration tank, or by conveying them to anaerobic digesters.

Rising capital and maintenance costs have created a demand for treatment devices having a minimum of moving parts and consuming relatively small amounts of power. To answer this demand for greater economy, some manufacturers have designed inchannel clarifiers which may be inserted directly into the flow of the aeration channel. These in-channel clarifiers have a minimum of moving parts, and are normally comprised of a tank and a combination of weirs and baffles which divert water from the main flow into a quiescent zone where solids separation can occur.

One such device is an intrachannel clarifier which consists of an open-bottomed tank positioned in a flow channel so that circulating wastewater flows underneath the open-bottomed tank. A series of angled baffles diverts a portion of the flow into the quiescent settling area which is defined by the walls of the open-bottomed tank. Solids settle out and are returned to the flow by the same baffles through which solids entered the quiescent zone. A submerged orifice discharge pipe is provided for removal of clarified effluent.

This and other intrachannel clarifiers presently on the market have three main disadvantages. First, the placement of the clarifier tank in the flow channel creates an impediment to the free flow of wastewater. Consequently, more energy is required to maintain a desired flow velocity, and the retention time of water in the tank must be increased to compensate for the reduction in tank capacity caused by the presence of the clarifier.

Second, intrachannel clarifiers promote the stagnation of sludge and resulting undesirable side effects. This stagnation results from the fact that the same baffled passageways are used for the diversion of wastewater into the clarifier as well as for the escape of settled solids back into the channelized flow for further biodegradation.

Stagnation occurs when lighter weight solids settling from water closer to the surface of the clarifier tank are intercepted by the incoming flow containing a greater proportion of heavier solids. These heavier solids tend to settle out first, and, when the effect of these heavier solids is combined with that caused by the velocity of the clarifier in-flow, the lighter solids are left with no means of reaching the channelized flow. Thus, the intrachannel clarifier fosters a "last in, first out" flow pattern.

A further consequence of the stagnated solids is a significant increase in cell breakup or lysing. This process occurs when biota attached to suspended organic matter is deprived of sufficient oxygen as a result of being retained in the clarifier tank for an excessive length of time, usually in the realm of two to three days. As the biota die off through suffocation, their cell structure breaks down, releasing organic compounds into the wastewater. Thus, materials which would normally settle out as a part of the suspended solid matter are released into the wastewater where they dissolve, becoming much more difficult to remove. A further disadvantage of lysing is an increase in the biochemical oxygen demand (BOD) of the wastewater. Thus, cell lysis impedes water treatment, for healthy organisms are necessary for optimum BOD removal in the clarified effluent.

Third, these intrachannel clarifiers have no positive means of removing scum unless costly mechanized skimming devices are incorporated into such tanks.

Consequently, there is a definite need for a clarifier which is compatible with channelized flow aeration tanks, which provides for proper circulation of wastewater therethrough, which minimizes solids stagnation and cell lysis, and which positively removes scum.

It is therefore an object of the present invention to provide a clarifier having no moving parts which is designed to operate within a channelized flow aeration tank.

It is another object of the present invention to provide a side flow clarifier which provides for proper solids cycling and removal.

It is a further object of the present invention to provide a low cost, side flow clarifier which does not impede the circulating flow of wastewater in the aeration channel.

It is a still further object of the present invention to provide a low cost, nonmechanized means of positively removing floating scum.

SUMMARY OF THE INVENTION

A side channel clarifier is provided for use with a complete mix aeration tank, and, more specifically, a VLR tank, having a wastewater flow circuit comprising an upper and lower flow chamber.

The clarifier of the present invention comprises a pair of clarification chambers located in the side walls of the VLR tank. Inclined baffles create a narrowed entryway extending the full length of the VLR tank's lower chamber through which influent enters the clarifier chamber. A portion of the flow which circulates through the VLR is diverted into the clarifier chamber by the pressure differential created between the clarification and aeration zones force of the hydraulic flow. The incoming water flows into the chamber where it encounters relatively quiescent conditions.

Once the wastewater loses its incoming velocity, suspended solids begin to settle to the bottom of the chamber. Instead of intercepting the incoming flow, the settled solids encounter the inclined baffle, which directs them to a plurality of sludge circulation ports located high enough in the clarification chamber to avoid the turbulence caused by incoming flow velocities. The sludge circulation ports are provided with fixed devices which create a siphon by which the flowing aerated water draws settled matter into the flow for further biodegradation. Means are also provided for removing the uppermost layer of clarifier effluent and separating it from any floating wastes.

Means are further provided for periodic removal of scum by raising the water level in the clarification zone to force the overflow of scum into a collection launder where it is discharged from the biological system.

DESCRIPTION OF THE DRAWINGS

The advantages of the present invention will become more apparent upon a review of the following drawings, in which.

DESCRIPTION OF THE PREFERRED EMBODIMENT

Figure 1:
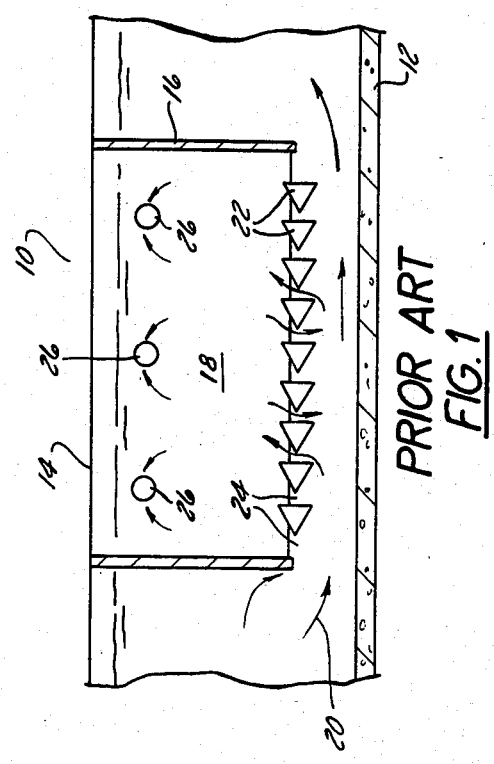
FIG. 1 depicts a side sectional view of a conventional intrachannel clarifier.

Referring now to the drawings, wherein like referenced characters designate identical or corresponding elements, FIG. 1 depicts a conventional in-channel clarifier 10 which is designed to be placed in an aeration tank 12 to be coextensive with the upper margin 14 of tank 12. In-channel unit 10 is comprised of a pair of vertically oriented end walls 16 which bridge the entire width of the tank 12 at that point. End walls 16 are separated by a space which becomes clarifier zone 18. Clarifier zone 18 is open at the bottom to the flow of wastewater 20 in tank 12, except for the provision of a series of regularly spaced, angled baffles 22 also known as clarifier bottom plates. The bottom plates 22 are angled to draw water from the flow 20 into the clarifier zone 18. Wastewater is drawn into the gaps 24 between bottom plates 22. Settled sludge collects on plates 22, which are angled to facilitate the reentry of solids into the flow 20. Some settling solids pass through gaps 24 directly into flow 20. Clarified water flows into submerged orifice effluent pipes 26.

As was previously mentioned, the first principal drawback of the conventional in-channel clarification system is that the end walls 16 provide a significant impediment to the flow 20 in tank 12. This disruption of the tank's flow dynamics requires additional energy for aeration and flow generation, as well as prolonging the required treatment time.

Secondly, settling solids are restricted from reentering the flow 20 by the hydraulic flow of incoming wastewater. Thus, sludge builds up in clarifier zone 18 for excessive amounts of time, resulting in stagnation and cell lysing of the bioorganisms.

Figure 2:
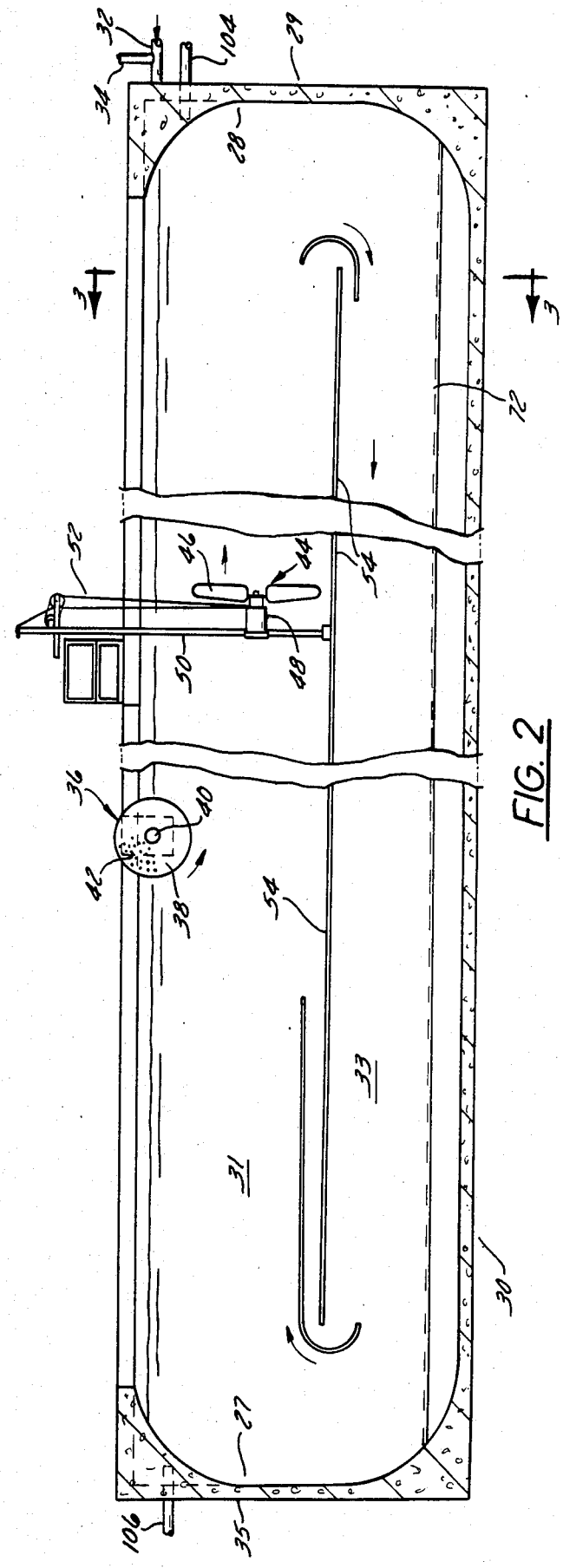
FIG. 2 depicts a side sectional view of the VLR tank used in conjunction with the present invention.

Referring now to FIG. 2, although the present invention may be employed in a variety of channelized aerator tanks, for purposes of illustration a VLR tank employing the present invention is depicted in side section. The VLR tank 30 is composed of a suitable material such as concrete, synthetic resin, steel, etc. The tank 30 is generally of rectangular shape and of any desired size to hold a desired amount of liquid. Tank 30 is provided with an influent end 29 and an effluent end 35. A major or longer axis of tank 30 can vary in length up to about 100-200 feet, while the width may vary from about 50-100 feet. The tank 30 is constructed to have a liquid depth of about 10-25 feet.

Raw sewage enters tank 30 through influent conduit 32. Influent conduit 32 is also provided with a connection for the addition of return sludge 34 so that the sludge which contains beneficial microorganisms is mixed with raw sewage just prior to entering tank 30. In this manner, the population of biota is maintained.

The mixed sewage is then aerated, as by mechanical aeration means 36, so that air bubbles or the like are introduced into the sewage in the upper layer of the tank. Aeration means 36 comprises a plurality of disks 38 mounted on a common axle 40 oriented on a transverse axis to the flow of sewage and designed to rotate so as to be at least partially in contact with the mixed sewage entering tank 30 via influent conduit 32.

The axle 40 is operationally connected to a drive means (not shown) such as an electric motor. The disks 38 are provided with a plurality of fine perforations and depressions 42 which function not only to carry air bubbles into and below the sewage liquor, but also to trap subsurface liquid therein and carry drops thereof upwardly into contact with the ambient air. The mechanical aeration means 36 thus introduces air below the surface of the liquid in tank 30 and provides surface energy through flow agitation of the sewage to prevent settling out of sewage solids. For additional aeration of lower chamber 33, a source of pressurized air is provided in the form of air conduit 37 and air diffuser headers 39 (see FIG. 3).

Mechanical aerator 36 is incapable of providing enough flow velocity to effectively operate tank 30. Thus, an additional mechanical flow inducer 44 is installed in the upper channel 31 to generate sufficient flow velocities. Flow inducer 44 may be comprised of any form of mechanical agitator, but in the preferred embodiment is comprised of an impeller blade 46 connected to a journalled shaft and a pulley assembly 48 which is mounted to a vertical support member 50. A belt or chain drive assembly 52 connects impeller blade 46 with a drive means such as an electric motor (not shown).

A baffle-like member 54 is located below the normal liquid level, approximately horizontally dividing the interior of the tank 30 into a plurality of equal volume flow passageways which, in the preferred embodiment, comprise an upper flow chamber 31 and a lower flow chamber 33. The baffle-like member 54 is gas-impermeable and may be composed of any rigid material such as metal or synthetic resin, but corrosion resistant characteristics are preferred.

Mixed sewage flowing into tank 30 through influent conduit 32 is immediately mixed with the contents of tank 30 and with air by means of mechanical aerator means 36. The aeration means 36 functions generally in a plane parallel to the direction of flow and induces air and flow energy into the sewage.

More specifically, mechanical aerators 36 perform the function of mixing air into the mixed sewage by drawing oxygen depleted sewage into the air and by pulling air into the wastewater. Mechanical aerators 36 also create a tank flow pattern in flow passageways 31 and 33 of an adequate velocity necessary to maintain the waste solids in a suspended condition. The waste solids must remain suspended as long as possible to enable the microscopic biota to optimally encounter and digest the organic waste compounds.

This directional flow created by mechanical aerating means 36, which must be supplemented in most applications by impeller 46, is aided by the geometry of the inner tank surface with its curved end walls 27 and 28, and travels along the entire length of the upper flow chamber 31 into the lower flow chamber 33 and then back into the upper flow chamber 31.

The flow of wastewater carries air in the form of trapped bubbles along the cyclical path from the upper to the lower flow passageway, where the oxygen component of the air is dissolved within the sewage liquors and is depleted by the active organisms contained in the water. The nature of the flow cycle is such that as a particular portion of liquid wastewater travels through the upper and lower passageways 31 and 33, it will be gradually depleted of its supply of oxygen from the point at which it leaves the mechanical aerator 36, until it encounters another aerator or returns to the starting point. The oxygen depleted nature of the wastewater as it encounters the aerator 36 significantly increases the efficiency of the device by facilitating the absorption of oxygen.

Referring now to FIGS. 3–6, the side flow clarifier 60 of the present invention is illustrated. Clarifier 60 is comprised of a separate clarifier unit incorporated into each of the two side walls 56 of the VLR tank 30. Clarifier 60 is further comprised of an upper clarifier effluent portion 62, a central clarification zone 64 and a solids collection and removal portion 66.

The solids collection and removal portion 66 is comprised of an inclined baffle 68 which depends on an incline from the intersection of baffle-like member 54 and upper channel partition 70. Inclined baffle 68 and partition 70 essentially serve as the side wall for upper and lower passageways 31 and 33. The angle of inclination of baffle 68 is critical, for if it is too great, the solids will not be effectively removed, and if it is not great enough, the solids will adhere to the wall of the baffle, causing stagnation. Inclined baffle 68 is provided with a lower margin 72 which extends almost to the corner of tank wall 56 and tank bottom 58, but leaves an in-flow gap 74. In-flow gap 74 extends the entire length of tank 30.

To prevent an accumulation of settled solids from forming an obstruction to the incoming flow through in-flow gap 74, the corner formed by tank wall 56 and floor 58 is provided with a fillet 82 which narrows in-flow gap 74.

Inclined baffle 68 is also provided with a plurality of sludge recirculation ports 76 spaced along the length of tank 30. Each recirculation port 76 is located a sufficient distance from lower margin 72 so that settled sludge reaching circulation port 76 will not be adversely affected by the rush of inflowing wastewater. Furthermore, recirculation ports 76 are oriented to be perpendicular to the flow of wastewater in chamber 33.

Sludge recirculation port 76 is also provided with a rigid recirculation flap 78 having a length greater than the height of recirculation port 76. Recirculation flap 78 is affixed to inclined baffle 68 at an angle so that flap 78 extends into the flow of lower channel 33.

The combined effect of the geometry and position of recirculation port 76 and recirculation flap 78 creates a siphon action 80 whereby the flow of water in lower chamber 33 draws out the settled solids and some of the water found in the solids collection and removal zone 66.

Situated above the solids accumulation zone 66 is clarification zone 64, which is essentially a transition area between the in-flow zone and the effluent removal zone. In contrast to the turbulence of upper and lower flow chambers 31 and 33, and to a lesser extent solids accumulation zone 66, clarification zone 64 is designed to provide the wastewater with relatively quiescent conditions to promote maximum settling. One means of creating these quiescent conditions is the provision of a significantly larger storage volume for clarification zone 64 when compared with the wastewater storage volume provided for solids accumulation zone 66.

Figure 3:
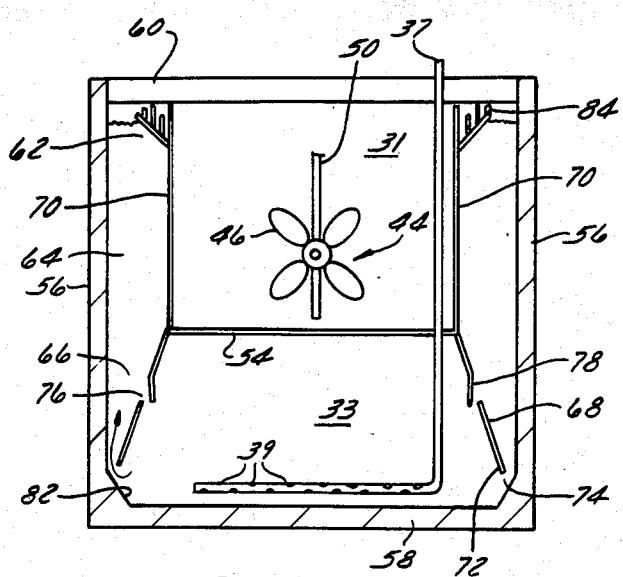
FIG. 3 depicts a sectional view along line 3—3 of FIG. 2 showing the VLR tank and side flow clarifier of the present invention.
Figure 4:
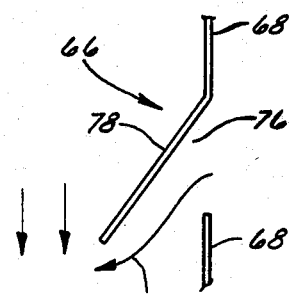
FIG. 4 illustrates an enlarged sectional view of the solids circulation port of the present invention.
Figure 5:
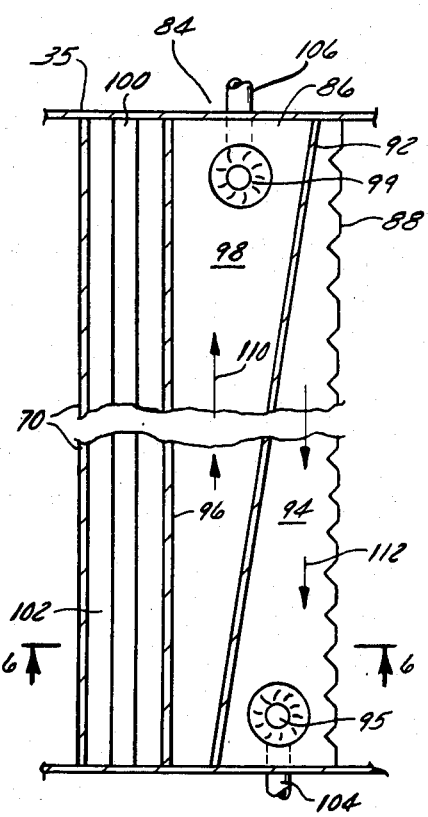
FIG. 5 depicts a plan view of the scum and effluent trough of the present invention in partial section taken along lines 5—5 of FIG. 6.
Figure 6:
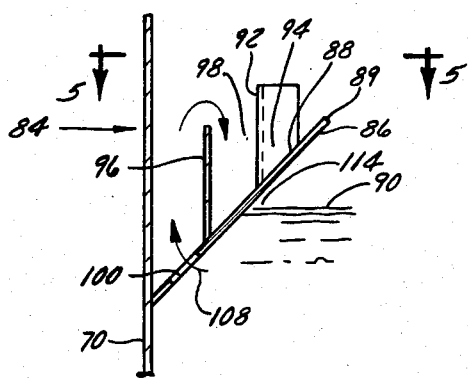
FIG. 6 depicts a sectional view of the scum and effluent trough of FIG. 5 taken along line 6—6 of FIG. 5.

Referring now to FIGS. 3, 5 and 6, directly above clarification zone 64 is the clarified effluent zone 62, which contains the effluent and scum removal apparatus 84. The effluent and scum removal apparatus 84 is comprised of an upwardly inclined member 86 having a V-notched weir 88 along its upper margin 89, which extends significantly above the normal water level 90. Member 86 may be oriented in tank 30 at a slight decline towards effluent end 35 to foster drainage.

Upwardly inclined member 86 is also comprised of a vertically projecting partition 92 which defines scum trough 94, comprising the upper portion of member 86 between partition 92 and weir 88 along the length of tank 30 as the scum flows toward the influent end 29. Partition 92 is angled so as to provide scum trough 94 with enough capacity to accomodate the progressively larger volume of scum which periodically spills over weir 88. Scum trough 94 is provided with effluent takeoff 95 which is connected to scum outlet 104. The direction of the flow of scum is shown at 112.

A second, vertically projecting partition 96 is located on inclined member 86 below, and having a shorter height than partition 92. Partition 96 delineates effluent trough 98, which extends the length of VLR tank 30, and conveys the clarified effluent to effluent takeoff 99, which is connected to effluent outlet 106. Clarified effluent exiting outlet 106 is directed to to either the nearest body of water or for further treatment if necessary.

In operation, a portion of the flow of wastewater in lower channel 33 is diverted through the action of hydraulic forces through in-flow gap 74 to clarifier 60. The relatively narrow dimension of gap 74 permits only the heaviest solid particles to settle out through gap 74 and back into the lower channel 33.

A majority of suspended solids and wastewater migrates from solids accumulation zone 66 to clarifier zone 64, where the quiescent conditions promote rapid and substantial settling of suspended solids. Settling solids are intercepted by inclined baffle 68 and are directed to sludge recirculation ports 76, from whence the solids are siphoned into the flow of lower channel 33 through the interaction of recirculation port 76 and recirculation flap 78.

As the settling process progresses in the upper portions of the clarification zone, the settling solids form a sludge blanket, above which a layer of relatively clean water is formed at normal water level 90. At this level, clarified water follows path 108, constantly passing through slots 100 and spilling over partition 96 into effluent trough 98. The greater height of partition 92 prevents the clarified effluent from entering scum trough 94. Also, the angled orientation of partition 92 provides increased capacity for the added volume of clarified effluent which flows towards effluent takeoff 99 along path 110. The effluent is then conveyed to the nearest body of water or for further treatment.

During normal operation, a layer of floating scum collects above water line 90 at point 114 all along tank 30. When the scum reaches an undesirable level, the water level of the tank 30 is allowed to rise by means of conventional valve means (not shown), to the point where the scum begins to spill over weir 88 and into scum trough 94. Once the scum layer has been depleted, the water level is returned to normal. The collected scum may be channeled into influent conduit 82 for retreatment.

Thus, the present invention provides a side channel clarifier comprising no moving parts, and which minimizes any impediments to aeration channel flow. The present invention ensures to proper recirculation of settled solids and, consequently, stagnation and cell lysing are minimized. In addition, the passive scum trough separates and recirculates floating wastes.

While particular embodiments of the side channel clarifier have been shown and described, it will be obvious to persons skilled in the art that changes and modifications might be made without departing from the invention in its broader aspects.

We claim:

1. In a sewage treatment apparatus for the treatment of wastewater containing settlable solids, said apparatus comprising an elongate confining means having end walls including a sewage inlet end and a sewage outflow end, side walls, a floor and an interior flow chamber comprising upper and lower liquid flow chambers separated by horizontal baffle means substantially coextensive with said confining means to form a continuous elongated channelized vertical flow circuit, and means to aerate the flow of liquid in said chambers, a side channel clarifier comprising means designed to permit optimum unrestricted wastewater flow velocities in said flow chambers, for precluding stagnation of sludge, and for providing positive scum removal, including:
   a clarifier chamber in at least one of said side walls extending the length of said confining means, said clarifier chamber comprising a lowermost influent portion, a central clarification portion and an uppermost effluent portion;
   said influent portion having restricted access means communicating with said flow circuit and including means to prevent the accumulation and stagnation of settled solids in said confining means, said means including said side wall being inclined to direct settled solids toward said access means;
   sludge recirculation means including at least one port located in said inclined side wall and constructed and arranged so that said settled solid matter adjacent to said port is drawn into the liquid flow in said flow chamber by a venturi effect, and not through said access means; and
   effluent and scum removal means.

2. The apparatus defined in claim 1 wherein said lowermost influent portion is provided with access means by which said wastewater may circulate between said lower liquid flow chamber and said clarifier.

3. The apparatus defined in claim 2 wherein said access means comprises baffle means and an influent inlet designed to allow a restricted inflow of wastewater into said clarifier chamber.

4. The apparatus defined in claim 3 wherein said baffle neans of said lowermost influent portion is said inclined side wall being inclined at an angle from the vertical.

5. The apparatus defined in claim 4 wherein said angle of inclination of said side wall baffle means is designed to provide said influent inlet with a narrower width than the width of said clarification chamber.

6. The apparatus defined in claim 1 wherein said clarifier is located adjacent to only the upper flow chamber.

7. The apparatus defined in claim 1 wherein said central clarification portion is constructed and arranged to provide a relatively quiescent solids separation zone wherein said solid materials suspended in said wastewater are allowed to settle into said influent portion and are returned to said liquid flow chamber via said recirculation means, leaving a clarified liquid component in said central clarifier portion.

8. The apparatus defined in claim 1 wherein said solids stagnation prevention means includes a pair of inclined fillets located at the junction of each of said side walls and said floor and extending the length of said confining means.

9. The apparatus defined in claim 8 wherein said influent inlet is adjacent to said fillet and forms a narrowed entryway for wastewater flowing into said lowermost influent portion.

10. The apparatus defined in claim 1 wherein said sludge recirculation means comprises a sludge recirculation port having a peripheral upper, lower and side margin and located in said inclined side wall between said influent inlet and said central clarification portion and having a flap.

11. The apparatus defined in claim 10 wherein said flap is rigid.

12. The apparatus defined in claim 11 wherein said flap is fixedly inclined into said lower flow chamber.

13. The apparatus defined in claim 12 wherein the inclination of said flap comprises a vertical dependence, resulting in the leading edge thereof extending lower than the lower margin of said recirculation port.

14. A clarifier chamber designed to be installed in the wall of a sewage treatment tank comprising upper and lower liquid flow chambers separated by a horizontal baffle means substantially coextensive with said tank to form a continuous elongated channelized vertical flow circuit, having a sewage in-flow end and a sewage outflow end and means to aerate the flow of liquid in said chambers, wherein said clarifier comprises means designed to permit optimum unrestricted wastewater flow velocities in said flow chambers, for precluding stagnation of sludge, and for providing positive scum removal including:
- a clarifier chamber in each of said side walls extending the length of said confining means, each of said clarifier chambers comprised of a lowermost influent portion, a central clarification portion and an uppermost effluent removal portion;
- said lowermost influent portion having a narrowed configuration and an influent means which restricts the inflow of wastewater into said clarifier chamber as well as restricting the exit of solids from said inlet neans;
- said lowermost chamber further comprising sludge recirculation means including at least one sludge recirculation port having a peripheral upper, lower and side margin and located between said influent inlet and said central clarification portion and having a flap;
- said sludge recirculation port constructed and arranged so that said solid matter adjacent to said port is drawn into the liquid flow in said flow chamber by a venturi effect without disrupting the flow of wastewater into said influent portion; and
- said clarifier chamber is constructed and arranged to substantially remove the solids from said wastewater while permitting optimum unrestricted wastewater flow velocities in said flow chambers.

15. The apparatus defined in claim 14 wherein said scum removal means comprises a plurality of elongate baffles having side edges, said baffles set vertically on said side edges to define a scum trough and an effluent trough, and said lower edges joined to a canted floor portion.

16. The apparatus defined in claim 15 wherein said canted floor portion is positioned at a slight incline with an uphill end and a downhill end.

17. The apparatus defined in claim 16 wherein said downhill end of said canted floor portion is adjacent to said sewage outflow end, said effluent trough and said scum trough are directly adjacent to each other and share a common wall.

18. The apparatus defined in claim 17 wherein said effluent trough and said scum trough extend the length of said tank.

19. The apparatus defined in claim 17 wherein said canted floor portion has a higher edge and a lower edge and is positioned so that its higher edge is oriented away from said upper liquid flow chamber and toward said clarifier, and so that said higher edge serves as an effluent weir for floating scum.

20. The apparatus defined in claim 19 wherein said scum trough is located higher on said canted floor portion than said effluent trough.

21. The apparatus defined in claim 20 wherein said vertical baffle defining said scum trough is constructed and arranged so that said trough is narrower at said sewage influent end than at said sewage discharge end.

22. In a sewage treatment apparatus for the treatment of wastewater containing settlable solids, said apparatus comprising an elongated tank having two end walls, one each with a sewage inlet end and a sewage outflow end, side walls, a floor, and an interior flow chamber comprising upper and lower liquid flow chambers separated by horizontal baffle means substantially coextensive with said tank to form a continuous elongated channelized vertical flow circuit, and means to aerate the flow of liquid in said chambers, a side channel clarifier comprising means designed for permitting optimum unrestricted wastewater flow velocities in said flow chambers, for precluding stagnation of sludge, and for providing positive scum removal including:
- a clarifier chamber in each of said side walls extending the length of said confining means, said clarifier chamber comprising a lowermost influent portion, a central clarification portion and an uppermost effluent portion;
- said clarifier chamber constructed and arranged to permit the influx of wastewater from said flow chamber into said lowermost influent portion, next into said clarification portion wherein said solids settle into said influent portion, lastly into said effluent portion;
- said lowermost influent portion including solids recirculation ports in said side walls through which settled solids are drawn into the main flow chamber by a venturi effect, without interfering with the inflow of wastewater into said influent portion of said lowermost clarifier portion; and
- said effluent portion comprising effluent and scum removal means including separate, adjacent elongate effluent and scum removal troughs; said troughs constructed and arranged so that as said clarified effluent reaches the top of said lower effluent chamber, said effluent spills into said effluent removal trough while said higher scum removal trough is used for the periodic removal of scum.

23. The apparatus defined in claim 22 wherein said scum removal means comprises a plurality of elongate baffles having said edges, said baffles set vertically on said side edges to define a scum trough and an effluent trough, said lower edges joined to a canted floor portion.

24. The apparatus defined in claim 23 wherein said canted floor portion is positioned at a slight incline with an uphill end and a downhill end.

25. The apparatus defined in claim 24 wherein said downhill end of said canted floor portion is adjacent to said sewage outflow end, and said effluent trough and said scum trough are directly adjacent to each other and share a common wall.

26. The apparatus defined in claim 23 wherein said canted floor portion has a higher edge and a lower edge and is positioned so that said higher edge is oriented outwardly away from said upper liquid flow chamber and toward said clarifier, and so that said higher edge serves as an effluent weir for floating scum.

27. The apparatus defined in claim 26 wherein said scum through is located higher on said canted floor portion than said effluent trough.

28. The apparatus defined in claim 27 wherein said vertical baffle defining said scum trough is constructed and arranged so taht said trough is narrower at said sewage influent end than at said sewage discharge end.

29. The apparatus defined in claim 22 wherein said effluent trough and said scum trough extend the length of said tank.

* * * * *